Figure 1:
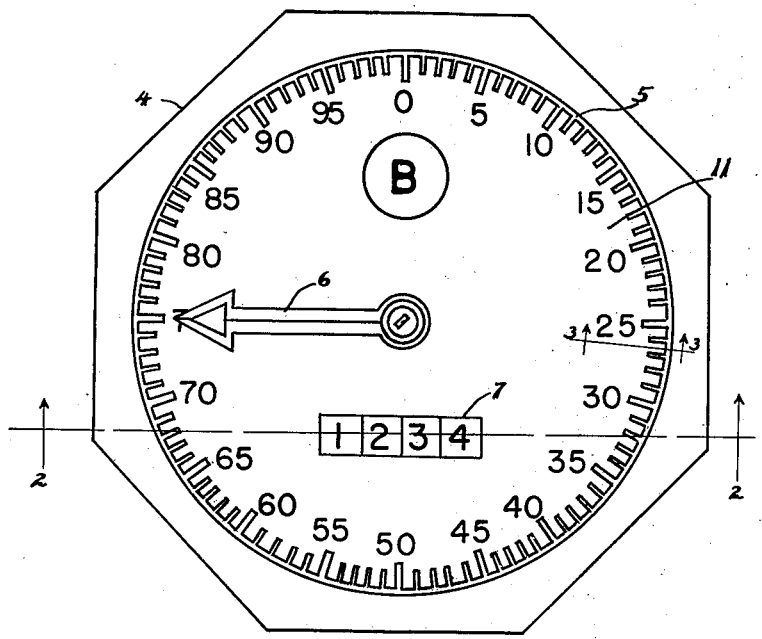

Aug. 30, 1938.　　　G. K. C. HARDESTY　　　2,128,246

INDICATING DEVICE

Filed Aug. 31, 1937

INVENTOR
GEORGE K. C. HARDESTY
BY
ATTORNEY

Patented Aug. 30, 1938

2,128,246

UNITED STATES PATENT OFFICE 2,128,246

INDICATING DEVICE

George K. C. Hardesty, Seat Pleasant, Md.

Application August 31, 1937, Serial No. 161,809

8 Claims. (Cl. 40—130)

(Granted under the act of March 3, 1883, as amended April 30, 1928; 370 O. G. 757)

My invention relates to indicating devices and more particularly to devices of the stated character wherein the indicia thereof are capable of being edge illuminated.

Indicating devices, if they are to be efficient, must provide an accurate and easily discernible indication when observed in and solely illuminated by daylight; and under cover of darkness must produce a like indication when the indicia of the device are artificially lighted. The indicating devices known to the prior art, however, have not been uniformly successful in attaining these desiderata which in accordance with my invention are achieved by a new and novel arrangement of parts possessing great simplicity.

In the preferred embodiment of my invention a plurality of laminations is arranged in superposed relation. The upper and lower laminations are respectively impervious and pervious to radiant energy and the intermediate lamination of a contrasting color with respect to the upper lamination. At least one indicium of any desired configuration extends through the upper and intermediate laminations into the lower lamination, means being arranged and operable to project radiant energy inwardly from the edge of at least the lower lamination for irradiating or illuminating the aforesaid indicium. Viewed by external light, such as daylight, no artificial illumination is required and each indicium appears as a thin line in the lower lamination outlined by the materials of the intermediate and upper laminations. Since the upper and intermediate laminations possess a good color contrast the indicia are greatly accentuated, thus making their precise character easily discernible. The indicating device of my invention is therefore entirely suitable for use in any form of external light.

When viewing the indicating device under cover of darkness the various indicia inscribed therein appear brilliantly and evenly illuminated in consequence of their subjection to edgewise illumination. This condition is in part attributable to the intermediate lamination which is fabricated from a material having good energy reflecting characteristics so that any radiant energy emanating from the indicial depressions in the lower lamination and impinging upon the intermediate lamination will be reflected into the field of view of an observer. Since the upper lamination is arranged to be directly viewed by an observer and the indicia extend inwardly therefrom, no errors in reading due to parallax can occur.

The device of my invention has a wide field of application, it being of course evident that the precise character of the indicia inscribed therein is wholly immaterial. Thus, the indicia might be fashioned as the graduations of a scale, as a fanciful arrangement of markings for display purposes, as lettering for advertising purposes or fashioned in any other manner to suit the conditions at hand.

In the light of the foregoing, it is among the several objects of my invention to provide an indicating device that may be viewed without parallax; to provide a device of the stated character wherein the inscribed indicia appear accentuated when viewed under external illumination; and to provide an indicating device of the edgewise illuminated type wherein at least a portion of the sides of an indicium inscribed therein is possessed of good energy reflecting characteristics so that any radiant energy originating in the indicial depressions and impinging on the aforesaid side portion will be reflected into the field of view of an observer.

Figure 2:
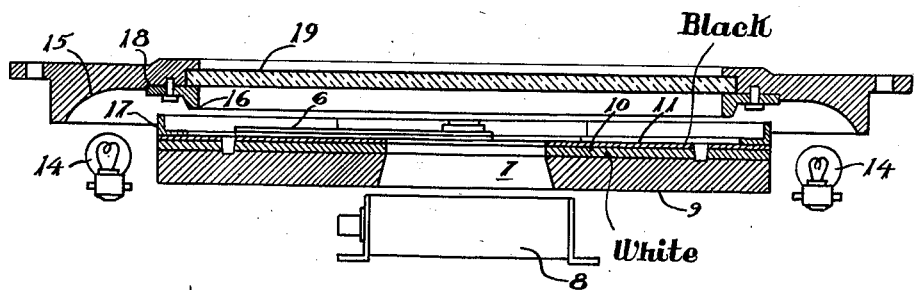
Figure 3:
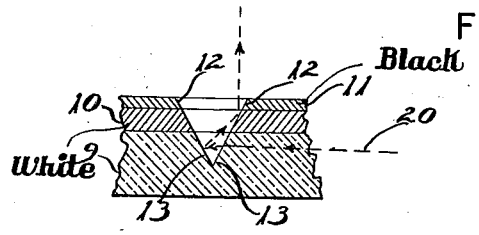

Other objects and many of the attendant advantages of this invention will be readily appreciated as the same becomes better understood by reference to the following detailed description when considered in connection with the accompanying sheet of drawings, wherein:

Fig. 1 is a plan view of the dial of a revolution indicator to which the instant invention has been applied;

Fig. 2 is a cross sectional view taken on the line 2—2 of Fig. 1 and showing in addition to the dial, lamps for illuminating the pointer as well as edge illuminating the superposed laminations, a light shield for the lamps, a device for totalling the revolutions and certain portions of the casing which serves to house the dial and its associated instrumentalities; and Fig. 3 is a fragmentary cross sectional view in elevation taken on the line 3—3 of Fig. 1 and showing on an enlarged scale the preferred contour of an indicium inscribed in the superposed laminations and the path that an edgewise projected light ray may take.

Turning now to the drawing there is shown depicted therein for illustrative purposes a device for indicating revolutions to which my invention has been applied. The dial 4 of the indicator, as shown in Fig. 1, is provided with a series of circumferential indicia 5 representing the R. P. M. of a rotating, marine propeller shaft. A pointer 6 suitably mounted on the dial cooperates with the graduations appearing thereon. If desired, the dial may be apertured at 7 so as to expose to the view of an observer the counter 8 which serves to total the revolutions of the shaft. The letter "B" inscribed on the face of the dial is arranged to be exposed to the view of an observer by instrumentalities forming no part of this invention to thus advise him that the propeller shaft is rotating reversely attending the movement of the ship in a sternwise direction.

The dial 4, as shown in Figs. 2 and 3, is comprised of a plurality of superposed laminations 9, 10 and 11 secured to each other in any suitable manner. The lower lamination 9 is fabricated from a convenient transparent material to thus be pervious to any radiant energy projected inwardly from the edge thereof. The lamination 10, however, is of an opaque or translucent material and is coated or covered with the lamination 11 which is opaque or impervious to any radiant energy. It is to be observed that the lamination 11 is of a contrasting color with respect to the lamination 10. By reason thereof any indicium inscribed in the superposed laminations will appear accentuated when viewed by external light. Furthermore, the intermediate lamination 10 is fabricated from a material having good energy reflecting characteristics so that any radiant energy impinging thereupon will be reflected into the field of view of an observer. Since the upper lamination 11 is arranged to be viewed by an observer and any inscribed indicium extends inwardly therefrom, it is evident that no error due to parallax can occur in reading the graduations of the indicator.

The inscribed indicia of the dial, as shown in Fig. 3, extend through the upper and intermediate laminations 10 and 11 into the lower lamination 9. The cross sections of these indicia may have any of a variety of contours. It is preferred, however, that the sides 12 of each indicium have such an angular relation to the surface of the upper lamination 11 as to expose substantial areas of the intermediate lamination 10 to the view of an observer. Since, as pointed out hereinbefore, the laminations 10 and 11 are of contrasting color such an angular inclination with respect to the surface of the upper lamination 11 will present to the view of an observer an accentuated indicium when seen in external light. Where the indicia penetrate the transparent plate or lamination 9, diffusing surfaces 13 are provided. In the case of plastic materials, these diffusing surfaces are produced by the engraving tool employed in forming the desired indicia. Etching or sand blasting would also produce the desired diffusing surface but is more suitable for materials such as glass and the like.

Although the instant invention can be carried into effect by utilizing many materials, colors, and marking methods, the plate or lamination 9 is preferably fabricated from a transparent synthetic resin having a thin layer or lamination 10 of opaque or translucent white covered by a thin layer 11 of dull black and engraved with a tool which will produce a suitable white outline for each inscribed graduation. The plate 9 may, if desired, have two laminations on each side thereof to thereby produce a double dial.

The white lamination 10 provides a good daylight contrast with respect to the black lamination 11 and thus produces an accentuated indicium when viewed by external light. Since the white lamination 10 also has good energy reflecting characteristics the efficiency of the dial is materially increased for the reason that any radiant energy originated in the indicial depressions and impinging on the intermediate lamination 10 will be reflected into the field of view of an observer. Although the graduations are shown in Fig. 3 of the drawing as V shaped in cross section I do not desire to be restricted thereto since, as pointed out hereinbefore, the graduations within the purview of my invention may have any of a variety of contours.

For illuminating the pointer as well as edge illuminating the dial 4, there is provided any convenient source of radiant energy, such as for example, a proper number of electric lamps 14 circumferentially spaced with respect to the dial and sufficiently numerous to furnish the requisite illumination. Some of the light emanating from these lamps is reflected from the surfaces 15 of the casing to thus illuminate the pointer 6 indirectly. No direct light from the lamp or casing reflecting surfaces, however, reaches the observer by reason of the light shield associated with the indicating device. This light shield is formed by a plurality of juxtaposed flanges 16 and 17. The flange 16 depends from a securing ring 18 which serves to hold a glass plate 19 securely in place in a portion of the casing. The flange 17, on the other hand, is part of an angular member which is secured to the surface of the dial 4 adjacent the circumference thereof.

When used under cover of darkness the lamps 14 not only illuminate the pointer 6 of the dial indirectly but also project radiant energy inwardly from the edge of the transparent lamination 9. Those light rays in the plate 9 which strike the diffusing surfaces 13 are diffused into the openings formed by the inscribed indicia. Some of these rays reach the observer directly and others are reflected from the exposed surface of the intermediate lamination 10 before reaching him. The light ray 20 depicted in Fig. 3 illustrates one of the many paths that the projected radiant energy may take. Part of the light passing through the transparent plate 9 may be refracted by the sides of the opening 7, or part of the area of the sides may have a ground surface to diffuse light therefrom for illuminating the counter 8. If the intermediate lamination 10 is of a translucent material it is clear that it will likewise receive and transmit some edgewise illumination.

According to the provisions of the patent statutes I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. An indicating device comprising in combination a plurality of superposed laminations, the upper and lower laminations being respectively impervious and pervious to radiant energy and the intermediate lamination being of a contrasting color with respect to the upper lamination, the said superposed laminations being provided with at least one incised indicium which extends through the upper and intermediate laminations into the lower lamination, and means operable to project radiant energy inwardly from the edge of at least the lower lamination for irradiating the aforesaid indicium.

2. An indicating device comprising in combination a plurality of superposed laminations, the upper lamination being arranged to be viewable by an observer and the lower lamination being pervious to radiant energy, the said superposed laminations being provided with at least one incised indicium which extends through the upper lamination into the lower one, and means operable to project radiant energy inwardly from the edge of the lower lamination for irradiating the aforesaid indicium.

3. An indicating device comprising in combination a plurality of superposed laminations, the upper and lower laminations being respectively impervious and pervious to radiant energy and the intermediate lamination being of a contrasting color with respect to the upper lamination, the upper lamination being arranged to be viewable by an observer and the said superposed laminations being provided with at least one incised indicium which extends through the upper and intermediate laminations into the lower lamination, the sides of said indicium having such an angular relation to the surface of the upper lamination as to expose substantial areas of the intermediate lamination to the view of an observer, and means operable to project radiant energy inwardly from the edge of at least the lower lamination for irradiating the aforesaid indicium.

4. An indicating device comprising in combination a plurality of superposed laminations, the lower lamination being pervious to radiant energy and the combined laminations being provided with at least one incised indicium which extends through the superposed lamination into the lower lamination, and means operable to project radiant energy inwardly from the edge of at least the lower lamination for irradiating the aforesaid indicium, the portions of the sides of the indicium formed by the superposed lamination having good energy reflecting characteristics so that any radiant energy impinging thereupon will be reflected into the field of view of an observer.

5. An indicating device comprising in combination a plurality of superposed laminations, the upper and lower laminations being respectively impervious and pervious to radiant energy and the intermediate lamination being of a contrasting color with respect to the upper lamination, the said superposed laminations being provided with at least one incised indicium which extends through the upper and intermediate laminations into the lower lamination, and means operable to project radiant energy inwardly from the edge of at least the lower lamination for irradiating the aforesaid indicium, the portions of the sides of the indicium formed by the intermediate lamination having good energy reflecting characteristics so that any radiant energy impinging thereupon will be reflected into the field of view of an observer.

6. An indicating device comprising in combination a plurality of superposed laminations, the upper and lower laminations being respectively impervious and pervious to radiant energy and the intermediate lamination being of a contrasting color with respect to the upper lamination, the upper lamination being arranged to be viewable by an observer and the said superposed laminations being provided with at least one incised indicium which extends through the upper and intermediate laminations into the lower lamination, the sides of said indicium having such an angular relation to the surface of the upper lamination as to expose substantial areas of the intermediate lamination to the view of an observer, and means operable to project radiant energy inwardly from the edge of at least the lower lamination for irradiating the aforesaid indicium, the portions of the sides of the indicium formed by the intermediate lamination having good energy reflecting characteristics so that any radiant energy impinging thereupon will be reflected into the field of view of an observer.

7. An indicating device comprising in combination a plurality of superposed laminations, the first and second of said laminations being respectively impervious and pervious to radiant energy and of a contrasting color with respect to each other, the said laminations being provided with at least one incised indicium which extends through the first lamination into the second, and means operable to project radiant energy inwardly from the edge of at least the second lamination for irradiating the aforesaid indicium.

8. An indicating device comprising in combination a plurality of superposed laminations, the upper and lower laminations being respectively impervious and pervious to radiant energy and the upper and intermediate laminations being respectively black and white to provide a good color contrast, the upper lamination being arranged to be viewable by an observer and the said superposed laminations being provided with at least one incised indicium which extends through the upper and intermediate laminations into the lower lamination, the sides of said indicium having such an angular relation to the surface of the upper lamination as to expose substantial areas of the intermediate lamination to the view of an observer, and means operable to project radiant energy inwardly from the edge of at least the lower lamination for irradiating the aforesaid indicium.

GEORGE K. C. HARDESTY.